United States Patent [19]

Yamada et al.

[11] Patent Number: 4,935,780

[45] Date of Patent: Jun. 19, 1990

[54] DOCUMENT FEEDING APPARATUS AND REPRODUCING MACHINE HAVING DOCUMENT FEEDING APPARATUS

[75] Inventors: Yasushi Yamada; Tsugio Hirabayashi; Susumu Okui; Hirofumi Sakaguchi, all of Tokyo, Japan

[73] Assignee: Konica Corporation, Tokyo, Japan

[21] Appl. No.: 154,800

[22] Filed: Feb. 11, 1988

[30] Foreign Application Priority Data

Feb. 13, 1987 [JP] Japan .................................. 62-29845
Feb. 13, 1987 [JP] Japan .................................. 62-29847
Mar. 25, 1987 [JP] Japan .................................. 62-70754

[51] Int. Cl.$^5$ .................... G03G 15/28; G03G 21/00
[52] U.S. Cl. .................... 355/235; 271/35; 271/122; 271/301; 355/313
[58] Field of Search ............... 355/3 SH, 14 SH, 309, 355/313, 318, 320, 235; 271/35, 121, 122, 125, 301

[56] References Cited

U.S. PATENT DOCUMENTS

| | | | |
|---|---|---|---|
| 3,984,095 | 10/1976 | Zimmer | 271/121 |
| 4,184,671 | 1/1980 | Sasamori | 355/320 X |
| 4,338,023 | 7/1982 | McGibbon | 355/14 SH |
| 4,424,964 | 1/1984 | Kikuchi et al. | 271/125 X |
| 4,428,666 | 1/1984 | Phelps et al. | 355/14 SH |
| 4,523,752 | 6/1985 | Kigawa et al. | 355/14 SH |
| 4,620,782 | 11/1986 | Kurando et al. | 355/14 SH |
| 4,621,921 | 11/1986 | Takahata et al. | 355/14 SH |
| 4,705,389 | 11/1987 | Maekawa et al. | 355/14 SH X |
| 4,736,937 | 4/1988 | Okuda et al. | 355/14 SH X |
| 4,771,317 | 9/1988 | Katoh et al. | 355/14 SH X |

Primary Examiner—Fred L. Braun
Attorney, Agent, or Firm—Jordan B. Bierman

[57] ABSTRACT

A document feeding apparatus having both an automatic and manual feed mode. the apparatus includes a paper feeding belt for feeding documents from a stack set on a document stacker, wherein the lowermost document in the stack is fed, and a stop roller placed in contact with an upper surface of the paper feeding belt to prevent the overlapped feed of documents. Documents are fed through a common paper path in both modes. The belt and roller are commonly used in both the automatic and manual document feed modes. In the automatic document feed mode, the belt is driven while the roller is held in a non-rotational state. In the manual document feed mode, the belt is driven and the roller is driven by the belt.

12 Claims, 9 Drawing Sheets

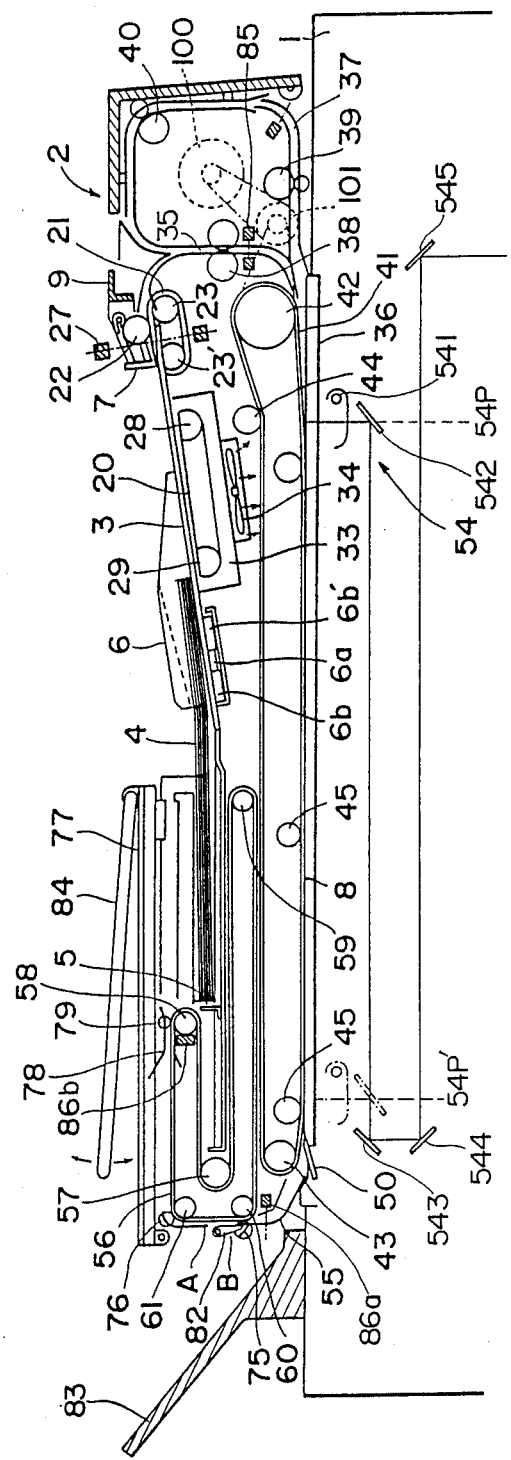
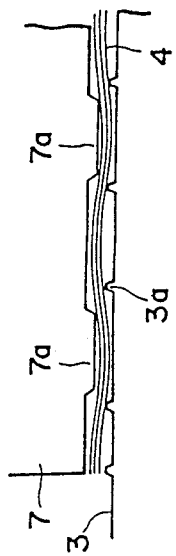
F I G. 1
F I G. 3

FIG. 2
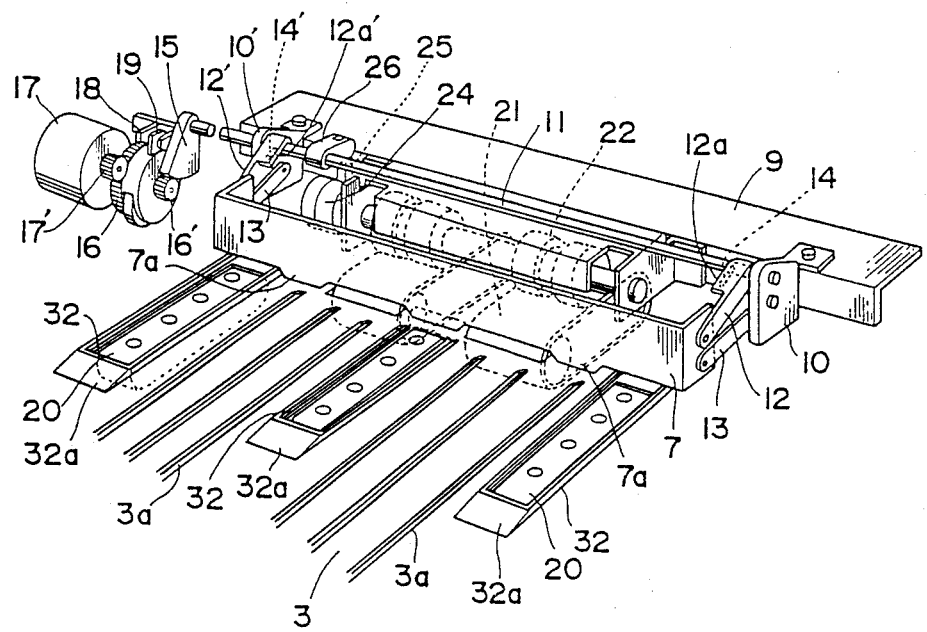
FIG. 5
FIG. 6
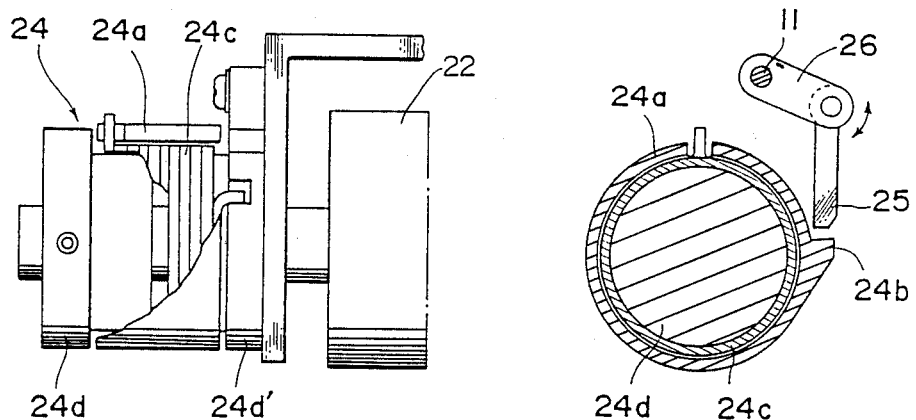

DOCUMENT FEEDING APPARATUS AND REPRODUCING MACHINE HAVING DOCUMENT FEEDING APPARATUS

BACKGROUND OF THE INVENTION

1. Field of the Invention

The present invention relates to a document feeding apparatus and a reproducing machine having the document feeding apparatus which can select a circulating copy mode wherein a document which is fed from a document supply portion and exposed on a platen glass plate is returned to the document supply portion or a non-circulating copy mode wherein the exposed document is discharged to a discharge paper tray provided outside the machine.

2. Description of the Prior Art

Generally speaking, some document feeding apparatus (ADF) of this kind can separate and feed the documents stacked on a document stacker one by one onto the platen glass plate of a reproducing machine and to discharge the documents exposed on the platen glass plate to a discharge dish outside of the machine Another document feeding apparatus (RDF) can perform repeated feeding by returning the exposed documents to the document stacker. Since these document feeding apparatus are equipped at their paper feed aperture with a document separating mechanism, they cannot feed either documents which are so liable to be broken that cannot withstand passage through the separating mechanism or documents which are difficult to be separated by the separating mechanism, such as stacked or folded documents. If such documents are circulated automatically, the reliability is reduced remarkably. In order to feed such documents, therefore, those document feeding apparatus are provided additionally to a paper feeding aperture 141 of a document stacker 140 of ADF or RDF, as shown in FIG. 14. For example, a manual insertion plate 145 is provided to communicate with entrance portions of a platen glass plate 142 of the reproducing machine and a feeding belt 143 arranged above the platen glass plate 142, so that a document can be fed on the platen glass in the manual insertion system (SDF) without passing through the separating means for the paper feeding aperture of ADF or RDF. Reference numeral 146 denotes a paper discharge plate.

Despite of this fact, however, the system has operation problems and a complicated construction because of two paper feed apertures.

Further, the copy surface of the document fed by ADF or RDF mode becomes opposite to that fed by the manual insertion mode, so that it is necessary to turn the document upside down according to the selected mode.

In such reproducing machine having the document feeding apparatus, the document fed on the platen glass plate is stopped at the exposing position and exposed while the optical exposure system is moved, irrespective of the circulating copy mode and the non-circulating copy mode.

In the circulating copy mode, the document automatically fed from the document stacker is exposed at the exposure processing portion and then returned to said document stacker, so that each page of the document is copied to obtain one copy without failure in order (RDF). On the contrary, in the non-circulating copy mode, the document automatically fed from the document stacker or fed manually is exposed at the exposure processing portion to obtain copies of required number and then discharged to the paper discharging tray mounted outside the machine (ADF or RDF).

Accordingly, it is necessary to stop the document on the exposure processing portion (platen glass plate) and to move the optical exposure system when the copying is carried out by the non-circulating copy mode. If, however, the document is stopped on the platen glass plate and the optical exposure system is moved every copy time in the circulating copy mode, a much time is required.

SUMMARY OF THE INVENTION

An object of the present invention is to solve the problems thus far described and to provide a document feeding apparatus wherein it is not necessary to turn the document upside down. Further object is to provide a document feeding apparatus simple in construction and high in reliability.

Another object of the present invention is to provide a reproducing machine having a document feeding apparatus wherein a copying is carried out by stopping a document and an optical exposure system is moved in a non-circulating copy mode, whereas the document is moved and the optical exposure system is fixed in a circulating copy mode.

The above-mentioned object can be achieved by a document feeding apparatus having a paper feeding aperture for feeding on a platen glass plate of a reproducing machine documents stacked on a document stacker, after separated by separating means one by one from the lowermost one, a paper circulating and discharging aperture for returning to the document stacker a document after it has processed on said platen glass, and a paper discharge aperture communicated to a path of paper circulating and discharging through a change-over pawl arranged on the way of said path aperture for discharging the document to the outside, wherein said paper feeding aperture having said separating means is used as a paper feeding aperture for inserting a paper manually so as to simplify in construction and to make the directions of the documents to be identical with one another.

The above-mentioned object can be attained further by a reproducing machine having a document feeding apparatus which can select a circulating copy mode wherein a document which is fed from a document supply portion and exposed on a platen glass plate is returned to the document supply portion or a non-circulating copy mode wherein the exposed document is discharged to a discharge paper tray provided outside the machine, characterized in that the document is exposed while moving in said circulating copy mode, and the document in a stational state is exposed in the non-circulating copy mode, so that the copying operation can be carried out effectively by merely operating the mode change-over means in the manual mode, SDF mode, ADF mode or RDF mode.

BRIEF DESCRIPTION OF THE DRAWINGS

FIG. 1 is a sectional front elevation showing a document feeding apparatus;

FIG. 2 is a perspective view showing a document stacker and a paper feed means;

FIG. 3 is an explanatory view showing a deformed state of documents pushed onto a document stacker by a gate member;

FIG. 5 is a partially cutaway front elevation showing a spring clutch fixed on a stopper roller shaft;

FIG. 6 is a sectional side elevation of the same;

DESCRIPTION OF THE PREFERRED EMBODIMENTS

Figure 4A:
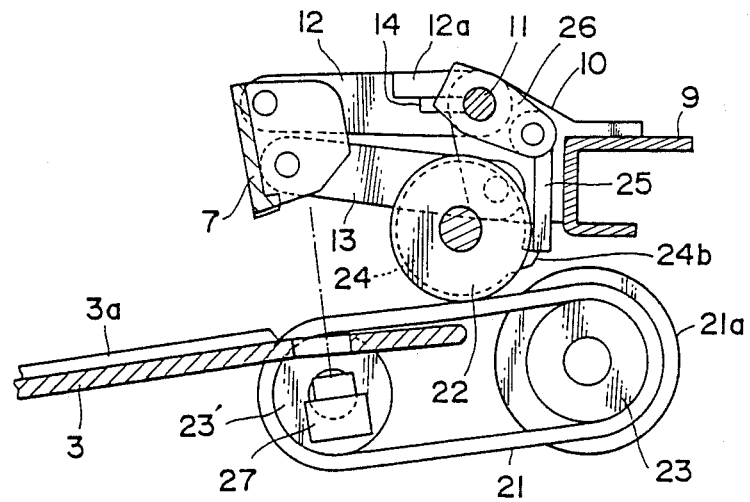
FIGS. 4A and 4B are explanatory views showing the operating states of the gate member.

In FIG. 1, reference numeral 1 designates a reproducing machine which can select between two copy modes having an exposing optical system moving and fixed. Numeral 2 designates a document feeding apparatus. This document feeding apparatus 2 is equipped with a document stacker 3 having its front portion rising upward. On this document stacker 3, there are mounted a rear end regulating member 5, by which are regulated the rear ends of documents 4 when the latter are to be set, and transverse width regulating plates 6 and 6' for regulating the widths of the documents 4. These transverse width regulating plates 6 and 6' are in meshing engagement, at the lower side of the document stacker 3, with racks 6b and 6b' which can transversely slide alternately across a pinion gear 6a so that they can move symmetrically with respect to the center. The transverse size of the documents can be read out by detecting the movements of the transverse width of regulating plates 6 and 6' with a not-shown sensor. On the other hand, the aforementioned rear end regulating member 5 has a function to push the leading ends of the documents 4, which are set on the document stacker 3, to the (fixed) detection position of a stack sensor 27.

Reference numeral 7 designates a gate member which takes an upper position, when the documents 4 pushed forward by the action of the aforementioned rear end regulating member 5, and which is moved downward onto the documents 4 by its own weight in response to a signal from said stack sensor 27 when the leading ends of the documents reach the detection position of the stack sensor 27. The gate member 7 has functions to hold the documents 4 to be fed by its own weight and to abut against the leading ends of the documents, which have made one circulation through a processing unit 8 and returned onto the document stacker 3, as will be described hereinafter, thereby to arrange the leading ends for a subsequent feed and to discriminate the restacked documents from the documents being fed. Thus, in order to exhibit those functions effectively, according to the present embodiment, the document stacker 3 are provided on its upper surface with ribs 3a which extend at a suitable interval in the paper feeding direction, as shown in FIG. 2, and the gate member 7 is provided at its lower end edge with a plurality of projections 7a which correspond to the intervals of the ribs 3a in the form of the so-called "comb teeth". In other words, the documents on their stacker 3 are undulated, as shown in FIG. 3, by the ribs 3a and the comb-toothed projections 7a to give a firmness to the documents 4 being fed and to effectively prevent the leading ends of the returned documents from sinking below the gate.

Figure 4B:
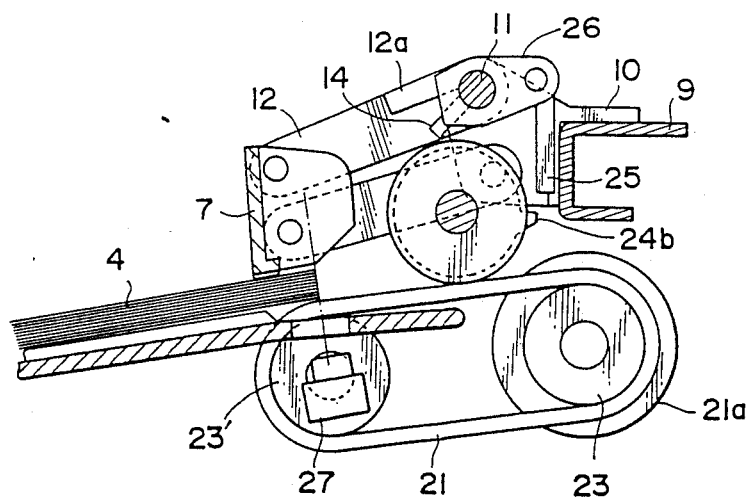

The aforementioned gate member 7 is formed generally in the shape of letter "C", as viewed in top plan, and has its two sides pivotally supported, as shown in FIG. 2, by both the leading ends of right and left gate levers 12 and 12', which having their base end portions fitted loosely on a shaft 11 borne rotatably on upper portions of brackets 10 and 10' fixed on a front frame 9 of the document feeding apparatus 2 by means of screws or the like, and the leading ends of auxiliary levers 13 and 13' which have their base end portions borne rotatably in lower sides of the brackets 10 and 10'. The gate levers 12 and 12' are provided at upper portions of their inner edges with extensions 12a and 12a' having lower sides, against which abut push-up pins 14 and 14' implanted in the aforementioned shaft 11. This shaft 11 has at its end portion fixed thereon a sector wheel 15, through which meshes with a small gear 16' aligned with a gate cam gear 16. This gate cam gear 16 in turn meshes with an output gear 17' of an reversible drive source 17. As a result, when the shaft 11 is rotated clockwise by the drive of the gate drive source 17, the aforementioned push-up pins 14 and 14' turns upward the gate levers 12 and 12' through their extensions 12a and 12a' to lift the gate member 7, as shown in FIG. 4 A. In this lifted position of the gate member 7, on the other hand, if the aforementioned shaft 11 is rotated counterclockwise by the drive of the gate drive source 17, the push-up pins 14 and 14' and the gate levers 12 and 12' riding on the former are turned downward to lower the gate member 7, as shown in FIG. 4B. At this time, the push-up pins 14 and 14' are allowed to relieve more that the angle at which the gate member 7 abuts against the documents on the document stacker 3. This causes the gate member 7 to hold the documents on the stacker by its own weight. Since the gate member 7 is followed by the aforementioned auxiliary levers 13 and 13' while it is moving up and down, its front face is kept in a generally normal position with respect to the upper surface of the document stacker 3. In other words, the gate member 7 is enabled to ride on the documents while having its front face normal to the document surface independently of the number of documents.

The aforementioned gate cam gear 16 is provided with a tongue 19 for shielding a sensor 18 for detecting the initial position thereof. This sensor 18 establishes a home position for the gate cam gear 16 when it is shielded with the tongue 19 so that it can rotate forward and backward the aforementioned drive source 17 by a necessary angle. This drive source 17 to be used in this case may preferably be a pulse-controllable stepping motor.

Reference numeral 20 designates a push-out belt for pushing out the documents from the predetermined position to the paper feed position. Numeral 21 designates a paper feeding belt for feeding out the documents in the paper feed position with the lowermost one first. Numeral 22 designates a stop roller contacting the paper feeding belt 21 for preventing any overlapped feed of the documents. The paper feeding belt 21 is made to run under tension between a drive shaft 23, which is connected to a main motor 100 through both an electromagnetic clutch 21a mounted on the drive shaft 23 and not-shown one-way control means, and a driven shaft 23' and to have its upper surface raised slightly from the ribs 3a of the document stacker 3. In this embodiment, paper feeding belt 21 and the stop roller 22 serve as means for separating the documents one by one.

On the shaft of the aforementioned stop roller 22, there is mounted a spring clutch 24. This spring clutch 24 is enabled, as shown in FIGS. 5 and 6, to relieve its spring 24c from spring bosses 24d and 24d' thereby to bring the stop roller 22 into freely rotatable state (for driven rotations) by pushing downward a projection 24b of a cylinder 24a by a clutch lever 25, and to regulate the rotations of the stop roller 22 when the clutch lever 25 exerts no action upon the projection 24b of the sleeve 24a. That clutch lever 25 is pivotally borne in a depending shape on the leading end of an arm 26 which in turn is fixed on the aforementioned shaft 11 in an opposite direction to that of the push-up pin 14 of the aforementioned gate lever. As a result, when the gate member 7 is lifted through the pin 14 by the rotations of the shaft 11, as shown in FIG. 4 A, the aforementioned clutch lever 25 is moved downward to push the projection 24b of the clutch 24 clockwise. When, on the other hand, the gate member 7 is moved downward to ride onto the documents 4 by the reverse rotations of the shaft 11, as shown in FIG. 4 B, the clutch lever 25 is brought upward apart from the projection 24b of the spring clutch 24 so that this spring clutch 24 is caused to restore its initial position by the action of its built-in spring thereby to regulate the rotations of the aforementioned stop roller 22.

The aforementioned push-out belt 20 is made of a holded belt, which is made to run under tension between the so-called "semicircular rollers" 28 and 29 having their outer circumferences partially cut away, to suck the lower sheet by means of a suction fan. Of the semicircular rollers, one 28 receives the driving force from the main motor 100 through a one-rotation spring clutch 30, as shown in FIG. 7, like the aforementioned paper feeding belt 21.

Figure 7:
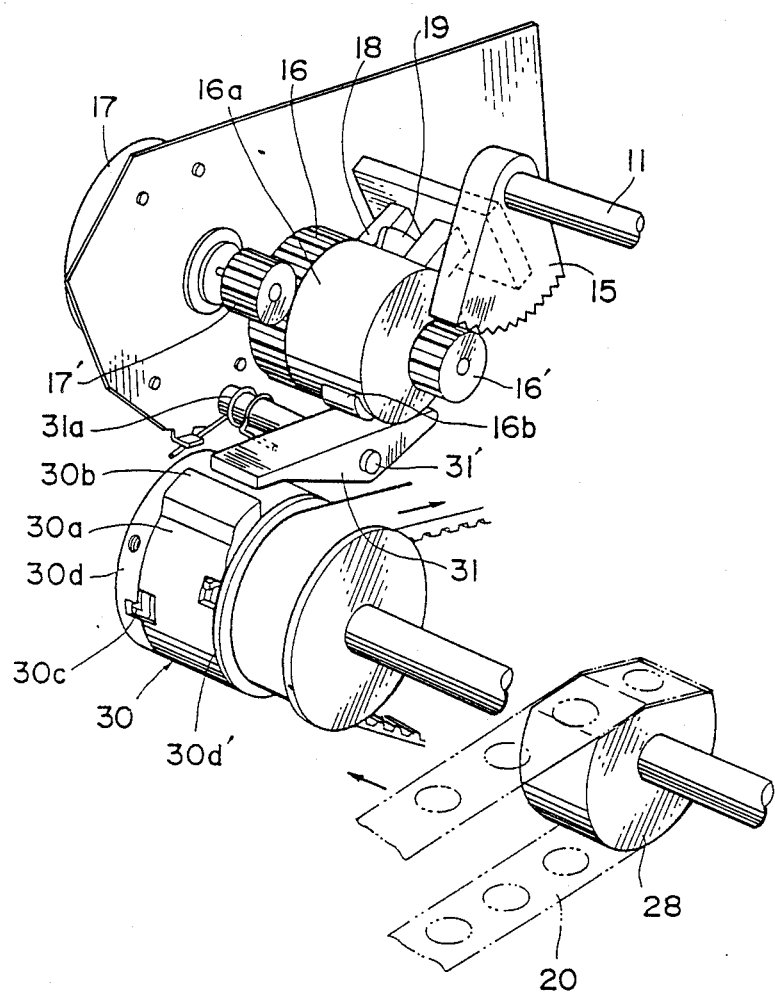
FIG. 7 is a perspective view showing one rotation control means of a semicircular roller.
Figure 8A:
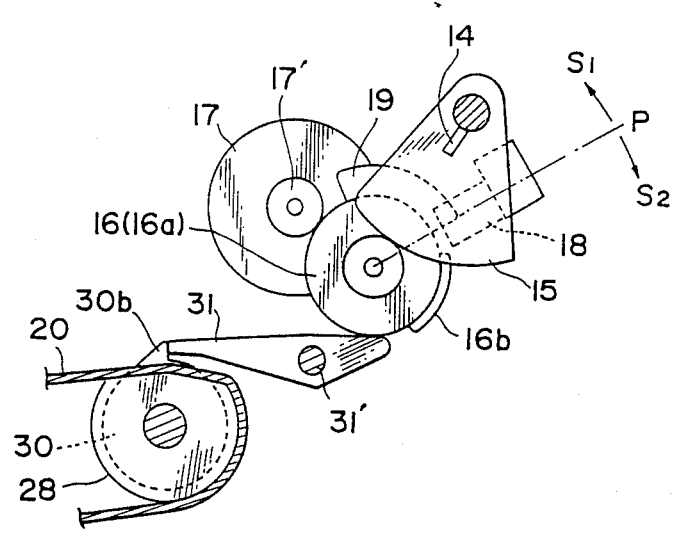
FIGS. 8A and 8B are explanatory views showing the operating states of the same one rotation control means.
Figure 8B:
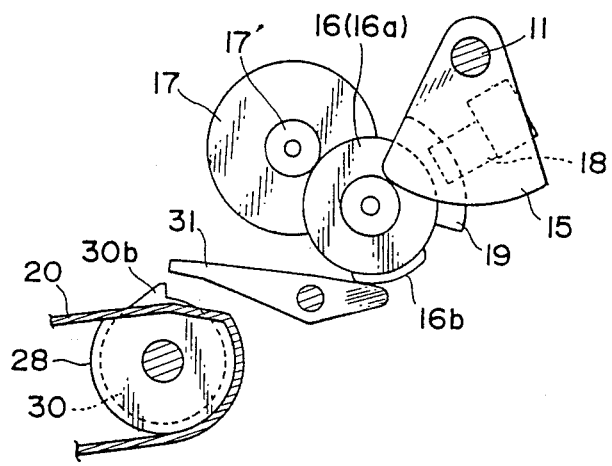

The one-rotation spring clutch 30 has its built-in clutch spring 30c loosened from spring bosses 30d and 30d' (as shown in FIG. 7) so that it is isolated from the driving force of the main motor 100, while a sleeve 30a has its projection 30b abutting against the leading end of a clutch lever 31 made movable up and down like a seesaw on a support 31', as shown in FIG. 8A, so that its rotations are regulated. When, on the other hand, the leading end of the clutch lever 31 goes out of engagement with the projection 30b of the sleeve 30a of the spring clutch 30, as shown in FIG. 8 B, the clutch spring 30c fastens the spring bosses 30d and 30d' so that the driving force of the main motor 100 is transmitted to the semicircular roller 28.

The rear end of the aforementioned clutch lever 31 is forced into contact with the cylindrical portion 16a of the aforementioned gate cam gear 16 by the action of a tension spring 31a. The cylindrical portion 16a is provided with a cam-shaped land 16b on a portion of its circumference. As a result, when the gate cam gear 16 is rotated by the action of the drive source 17 of the gate member 7 to have its cam-shaped land 16b push down the rear end of the clutch lever 31, the leading end of this clutch lever 31 goes out of engagement with the projection 30b of the sleeve 30a of the spring clutch 30.

The rocking motions of this clutch lever 31 are accomplished within such a rotational region of the gate cam gear 16 as is independent of the upward and downward drives of the gate member 7 during the downward movement of said gate member 7. In other words, the gate cam gear 16 has a home position (as indicated at reference letter P in FIG. 8A), which is determined by the initial position detection sensor 18 and the tongue 19, as has been described hereinbefore. The rotational region $S_1$, which is taken counterclockwise from that home position P, is used for moving the gate member 7 upward and downward, whereas the rotational region $S_2$ taken clockwise is used for locking the clutch lever 31.

Within the rotational region $S_2$ of the gate cam gear 16, specifically, the stepping motor acting as the aforementioned drive source 17 rotates clockwise from the above-specified point P to an extent corresponding to a constant number of pulses and then counterclockwise by the same number of pulses.

Here, in the rotational region $S_2$ of the gate cam gear 16 to be used for those rocking motions, the pushup pin 14 escapes from the gate lever 12, and the sector wheel 15 will skip to the small gear 16' at its tooth end.

When the leading end of the clutch lever 31 goes out of engagement from the projection 30b of the sleeve 30a, as has been described hereinbefore, so that the rotations of the semicircular roller 28 are started by the main motor, the gate cam gear 16 is rotated counterclockwise by the backward rotations of the gate driving source 17 so that the rear end of the clutch lever 31 is disengaged from the camshaped land 16b and returned by the spring 31a to a position close to the sleeve 30a of the spring clutch 30 which has been passed at its leading end by the projection 30b. This projection of the sleeve 30a of the spring clutch, which has accomplished one rotation following the semicircular roller 28, comes again into abutment against the leading end of the clutch lever 31 to effect isolation of the driving force of the main motor 100. Thus, the semicircular roller 28 never fails to halt after each one rotation.

Figure 9A:
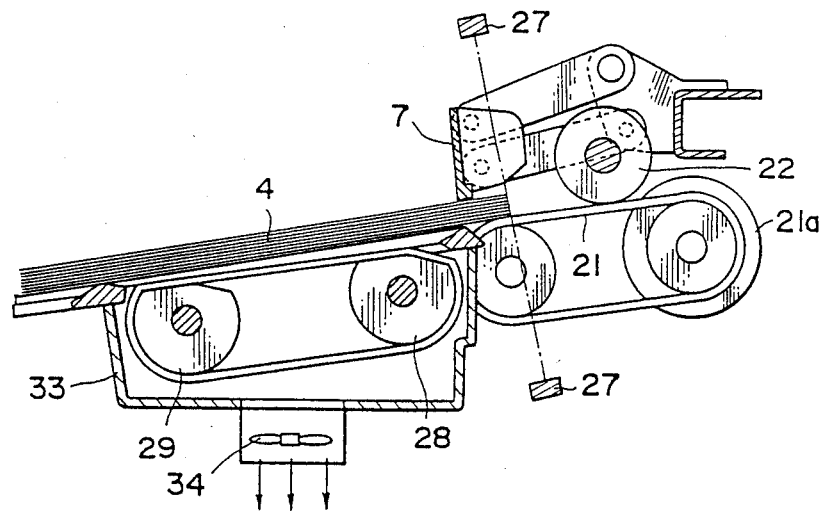
FIGS. 9A and 9B are explanatory views showing the operating states of a push belt (or semicircular roller)
Figure 9B:
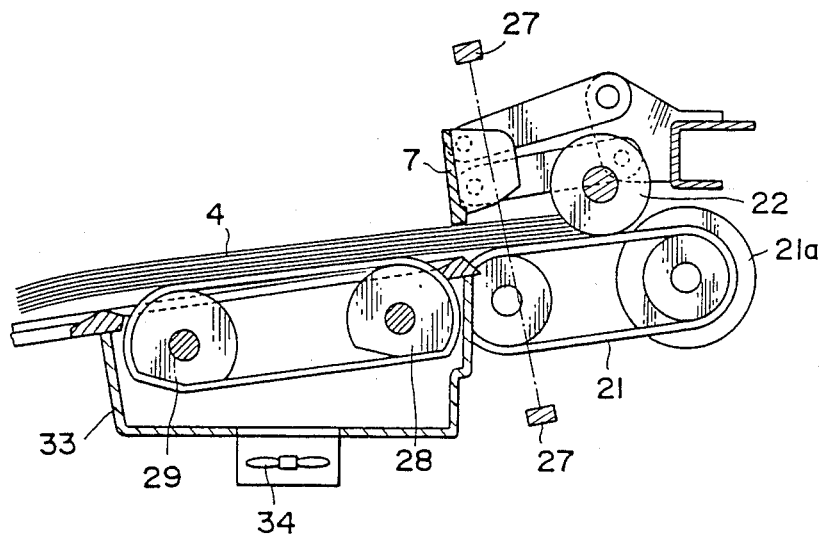

On the other hand, the aforementioned push-out belt 20 is disposed, as shown in FIG. 2, in each of apertures 32 which are juxtaposed to one another in a plurality of positions (e.g., in three positions, as shown) over the document stacker 3. Each aperture 32 has its peripheral edge rising to the same level as that of the ribs 3a of the document stacker 3 and sloped upstream of the paper feeding direction, as indicated at 32a, so that the leading ends of the documents may not be caught. Moreover, the upper belt surface will sink below the aperture 32, as shown in FIG. 9A, when the semicircular roller 28 or 29 rotates to bring its cut-away portion up, but will bulge, as shown in FIG. 9B, when the semicircular portion of the semicircular roller 28 or 29 is brought up. Specifically, the documents 4 in the fixed position on the document stacker 3 are frictionally pushed out by the push-out belts 20 bulging from the apertures 32 as the semicircular rollers 28 and 29 make one rotation. Since, in this case, the paper feeding belt 21 is halted because the power of the main motor 100 is interrupted by the action of the electromagnetic clutch 21a, the leading ends of the documents pushed out will bite in the form of a wedge into the nipping (or loosening) portion between the paper feeding belt 21 and the stop roller 22.

Reference numeral 33 designates a suction box which is disposed to surround each of the aforementioned push-out belts 20 from the lower side of the document stacker 3. The suction box 33 is enabled by the sucking action of its suction fun 34 to such the lowermost one sheet of the documents through the clearance between the aforementioned aperture 32 and the push-out belt 20 and through the belt holes so that the pushing-out force of the push-out belt 20 may be effectively exhibited.

Numeral 35 designates a forward passage for guiding the documents fed out by the aforementioned paper feeding means onto the platen glass plate 36 of the reproducing machine 1 acting as the processing unit 8. Numeral 37 designates a turning passage for turning the documents once fed onto said platen glass plate 36 before or after the exposure. This turning passage 37 is provided for correcting the turns of the even-numbered pages of two-sided documents toward the platen glass plate 36 and the sequence of the pages when the documents thus corrected and exposed are to be returned to the document stacker 3. Thus, the turning passage 37 merges into the upper portion of the aforementioned forward passage 35 after it has drawn an upward loop from the same plane as that of the aforementioned platen glass plate 36.

Numeral 38 designates a conveyor roller which is disposed midway of the aforementioned forward passage 35, whereas numerals 39 and 40 designate conveyor rollers which are disposed midway of the aforementioned turning passage 37. These conveyor rollers 38, 39 and 40 are so connected to the main motor 100 through one-way control means that they can rotate in the same feeding direction at all times.

Numeral 41 designates a conveyor belt for conveying the documents forward and backward on the upper surface of the platen glass plate 36. This conveyor belt 41 is made to run under tension between a first roller 42 connected at the feed side to the main motor 100 through forward/backward switching means 101 and a second roller 43 at the discharge side. A tension roller 44 is forced into contact with the upper belt surface near the first roller 42, and the lower belt surface is held in sliding contact with the platen glass plate 36 by a plurality of holding rollers 45.

Figure 10:
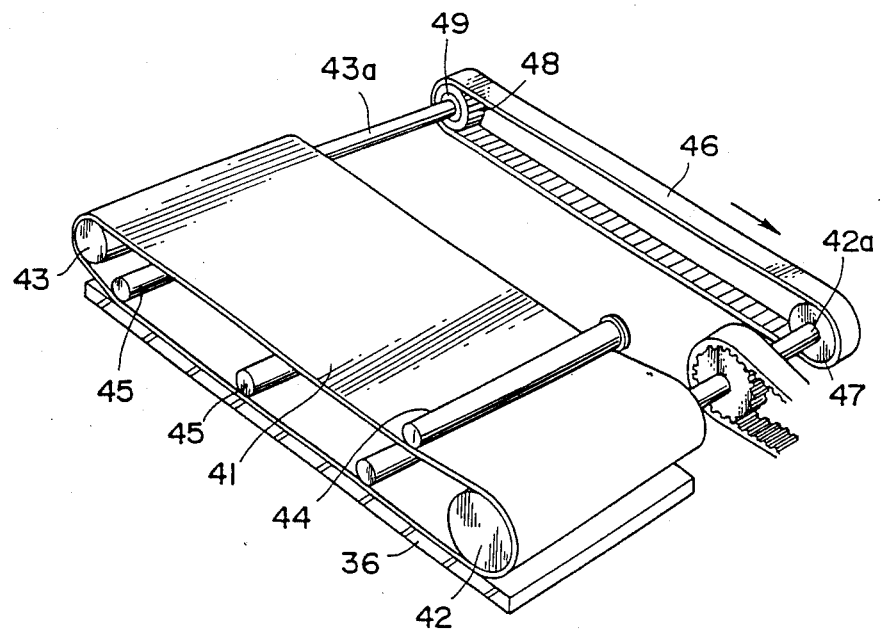
FIG. 10 is a perspective view showing the drive system of a conveyor belt.

The first roller 42 and second roller 43 described above are connected to each other through a timing belt 46, as shown in FIG. 10. In this connection, a timing pulley 47 located at the side of the first roller 42 is fixed on a first roller shaft 42a, and a timing pulley 48 located at the side of the second roller 43 is fixed on a second roller shaft 43a through a one-way clutch 49. Moreover, the circumferential speed of the first roller 42 is made slightly higher than that of the second roller 43 which is driven through the one-way clutch 49. As a result, the conveyor belt 41 is run in the forward direction (as indicated by arrow in FIG. 10) by the driving force of the first roller 42 to loosen the lower belt surface. Meanwhile, the second roller 43 is sliding through the one-way clutch 49 but is enabled to act as a drive side to drive the conveyor belt 41 by the action of the one-way clutch 49 which is locked when the conveyor belt 41 slips relative to the first roller 42, for example, by some cause so that its driving force is not fully transmitted to lower the running speed. When, on the contrary, the conveyor belt 41 is run in the opposite (i.e., counterclockwise) direction, the one-way clutch 49 is locked so that the second roller 43 acts as the drive side of the conveyor belt 41. In other words, the conveyor belt 41 can run with the drive side of either the first roller 42 or the second roller 43. This switching is effective especially when the documents are synchronously exposed while being fed on the platen glass plate.

Figure 11:
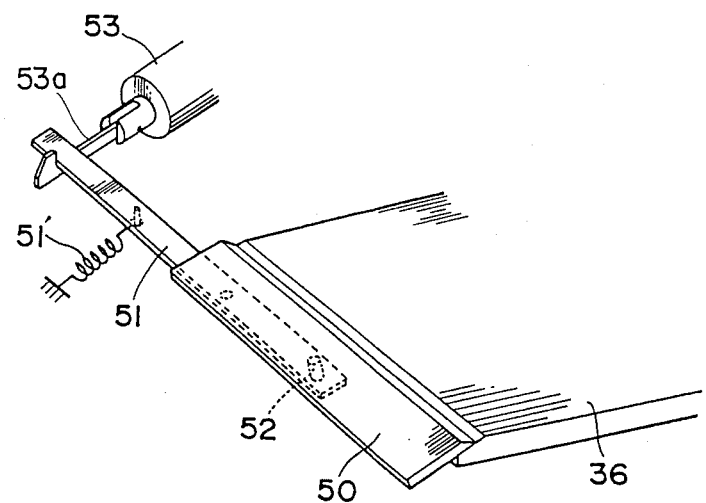
FIG. 11 is a perspective view showing the actuating mechanism of a document stopper.

Reference numeral 50 designates a document stopper which is disposed at the end portion of the platen glass plate 36 at the discharge side. As shown in FIG. 11, this stopper 50 is supported at its central portion through a connection pin 52 by one end of an actuating lever 51, which can rock like a seesaw, and is enabled to approach or retract from the platen glass plate 36 by the action of a solenoid 53 connected to the other end of the actuating lever 51 and a spring 51' facing the solenoid 53. Accordingly, in case of a so-called manual copy time wherein the document feeding apparatus 2 is stood up and a document directly set on the platen glass plate 36 by using the document stopper 50 as a pressing plate for the document is copied, the document stopper 50 can also be used as a scale to which the document is pushed. Thus, a scale showing the document sizes is formed on the upper surface of the document stopper 50. The document stopper 50 thus constructed sinks from the platen glass plate 36 in the RDF mode, i.e. circulating copy mode, and in the ADF, i.e. non-circulating copy mode, on the other hand, the document stopper 50 bulges above the platen glass plate 36 in synchronism with the movement of the document. Reference numeral 54 denotes an optical exposure system mounted below the platen glass plate 36 consisting of a light source 541 for irradiating the document, and a first mirror 542, second and third mirrors 543 and 544, and fourth mirror 545 for leading a light reflected from the document surface. The light source 541 and the first mirror 542 in the optical exposure system 54 can move horizontally as a unit. In the normal state, the optical exposure system 54 is stopped at a suitable portion near the paper feed side of the platen glass plate 36 as a stational exposure position $54_p$ in the circulating copy mode, and the optical exposure system 54 is moved reciprocately setting a suitable portion near the paper discharge side of the platen glass plate 36 as a start position $54_p'$ of the moving exposure in the non-circulating copy mode.

Figure 15:
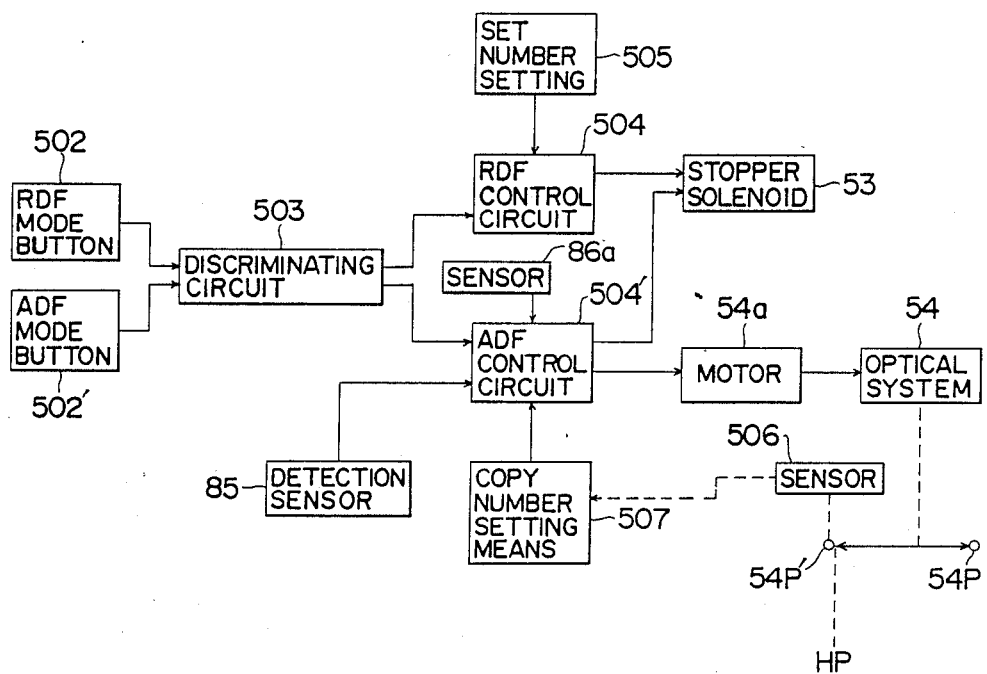
FIG. 15 is a block diagram of control means for the document stopper and an optical exposure system.

The selection of RDF mode and ADF mode is effected by depressing a mode selecting button arranged in an operation panel (not shown) of the document feeding apparatus. Specifically, as shown in FIG. 15, when an RDF mode button 502 is depressed an RDF control circuit 504 is driven through a discriminating circuit 503 to apply an operation signal to the solenoid 53. The signal is continued until a completion signal is generated from set number setting means 505, and the solenoid 53 pulls the plunger 53 against the spring 51' to lower the document stopper 50 under the platen glass plate 36. On the other hand, when an ADF mode button 502' is depressed an RDF control circuit 504' is driven through the discriminating circuit 503 and the drive motor 54a of the optical exposure system 54 is operated, so that the optical exposure system 54 is moved from the stational exposure position $54p$ to the start position $54p'$ of the moving exposure. The start position $54p'$ is detected by a sensor 506. In this stage, no operation signal is applied from an ADF control circuit 504' to the solenoid 53. Accordingly, said document stopper 50 is in a state projected above the platen glass plate 36. Thus, the document fed on the platen glass plate 36 through the forward passage 35 from the document stacker 3 is stopped by said document stopper 50 on the platen glass plate 36. The conveyor belt 41 is operated by the ADF control circuit 504' so as to start the movement of the document when the leading end of the document is detected by a sensor 85 arranged midway the forward passage 35 and to stop when the document reaches the document stopper 50. After the conveyor belt 41 is stopped the optical exposure system 54 is moved reciprocately from the start position. The exposure is carried out while the optical exposure system 54 is moved forwards. The exposure scanning is counted by the start position sensor 506 and when the copy number reaches a number set by copy number setting means 507 a completion signal is applied on the ADF control circuit 504' from the copy number setting means 507, so that the ADF control circuit 504' applies an operation signal to said solenoid 53. Thus, the document stopper 50 is lowered below the platen glass plate 36 and the conveyor belt 41 is moved. Such operation is repeated until all of the documents on the document stacker 3 are fed, so that final page of the documents is detected by a first paper discharge sensor 86a.

Further more, the operation of the document stopper 50 and the optical exposure system 54 at the SDF mode can be effected in the same manner as at the ADF mode, however, there is a control specialized for the SDF mode. Accordingly, it is necessary to arrange such that an actuator for the SDF mode is ON when a SDF mode button is depressed or a manual insertion plate 84 is extended as explained below and the ON signal provided by the push button or the actuator for SDF mode drives the ADF control circuit 504'.

Numeral 55 designates a paper discharge guide plate which extends to the exit of the platen glass plate 36, and numeral 56 designates a discharge belt. This discharge belt 56 is so made to run under tension on a set of rollers: a drive roller 57 borne just behind the document stacker 3 and connected to the main motor 100 through one-way control means; upper and lower end rollers 58 and 59 borne to move horizontally along the upper and lower surfaces of the document stacker 3; and auxiliary rollers 60 and 61 borne in the vicinity of the aforementioned paper discharge guide plate 55, so as to surround the rear side of the document stacker 3 in the shape of letter "C". The discharge belt 56 thus constructed is enabled to convey in the discharging direction the documents which are fed out of the conveyor belt 41 as the aforementioned drive roller 57 rotates in a predetermined direction.

Figure 12:
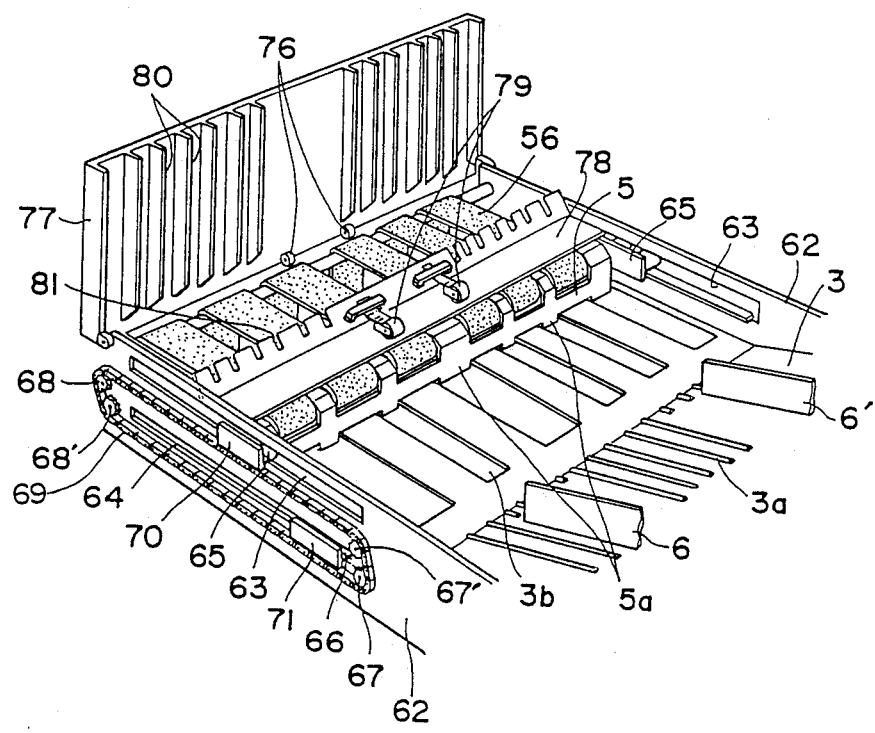
FIG. 12 is a perspective view showing the rear side of a document stacker.
Figure 13:
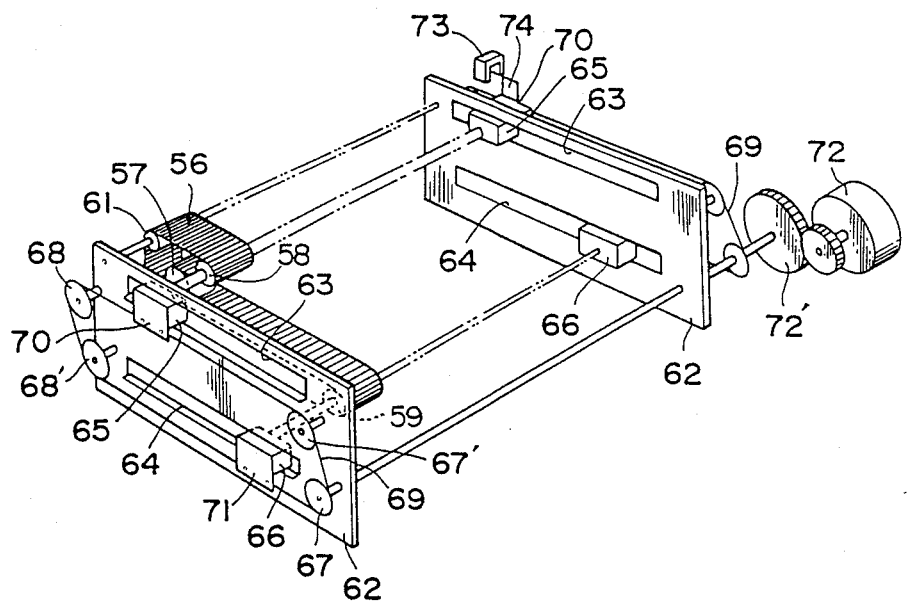
FIG. 13 is a schematic perspective view showing a drive means of a paper discharge belt and a rear end regulating member.
Figure 14:
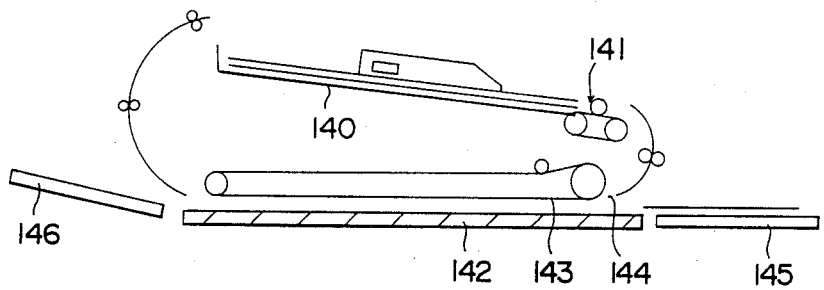
FIG. 14 is a schematic section showing the document feeding apparatus of the prior art.

The upper and lower end rollers 58 and 59 of the paper discharging belt 56 are born, as shown in FIG. 12, between upper moving members 65 and lower moving members 66, respectively, which are held in a sliding manner through roller members in two parallel horizontal grooves 63 and 64 formed in the two side frames 62 of the document feeding apparatus 2. The respective moving members 65 and 66 are coupled through attachments 70 and 71 to the upper and lower sides of chains 69 which are made to run under tension on two sprockets 67 and 67' and two sprockets 68 and 68' borne in the front and back of the aforementioned two side frames 62. Moreover, the sprocket 67 located at the lower side of the front portion is connected through an intermediate gear 72' to an reversible chain drive source 72, as shown in FIG. 13. As a result, when the chain drive source 72 runs the chains 69 forward or backward, the belt portion located over the document stacker 3 moves forward or backward together with the upper end roller 58 which is borne on the upper moving member 65 whereas the lower belt portion moves backward or forward together with the lower end roller 59 borne on the lower moving member 66 so that the belt tension can always be maintained at a constant level.

The moving means of the paper discharging belt 56 is constructed as the movement control means of the aforementioned rear end regulating member 5 against which the documents have their rear ends abutting when they are to be set on their stacker 3. The rear end regulating member 5 is so fixed to the aforementioned upper moving members 65 as to cover the front of the upper end roller 58. The rear end regulating member 5 is provided, as shown in FIG. 12, at its lower end edge with extensions 5a which can be fitted in the shallow recesses 3b formed in parallel with the paper feeding direction in the upper surface of the rear portion of the document stacker 3 so that the documents to be pushed out may not sink below the rear end regulating member 5.

In FIG. 13, reference numeral 73 designates a home position sensor for the rear end regulating member 5. This sensor 73 defines as the home position of the rear end regulating member 5 the position, in which it detects a shielding member 74 mounted on the attachment 70 connected to the upper portion of the aforementioned chain 69. This home position determined the position, against which the rear end of the documents of a maximum size (e.g., the A3 size) can abut. Therefore, the longitudinal size of the documents can be read out in terms of the moving distance from that position to the position in which the leading end of the documents is detected by the aforementioned stack sensor 27. When this stack sensor 27 detects the leading end of the documents, moreover, it outputs not only a downward signal to the drive source 17 of the gate member 7 but also a stop signal to the drive source 72 of the chain 69 for moving the aforementioned moving members 65 and 66 and a signal, to said drive source 72, for retracting the rear end regulating member 5 from the front of the gate member by a distance corresponding to the read size of the documents of interest, as has been described hereinbefore.

Reference numerals 75 and 76 designate holding rollers which are disposed in positions corresponding to the aforementioned auxiliary rollers 60 and 61 and in abutment against the paper discharging belt 56 from the outside of the paper discharging guide plate 55 through the aperture. Numeral 77 designates a ceiling guide plate which has its base end hinged to the upper portions of the rear ends of the two side frames 62 of the document feeding apparatus 2. Numeral 78 designates a discharge aperture guide plate which is disposed to face the upper moving members 65 bearing the aforementioned upper end rollers 58 at a small clearance from the upper surface of the upper belt portion of the paper discharging belt 56. Numeral 79 designates a holding roller which is in abutment against the paper discharging belt 56 through the aperture from the upper surface of said paper discharging aperture guide plate 78. The aforementioned ceiling guide plate 77 has its lower face serving as a guide surface provided with a plurality of ribs 80 arranged in the discharging direction to orient the documents. On these ribs 80, there are telescopically fitted notches 81 which are formed in the upper edge of the upward sloped rear plate of the paper discharging guide plate 78 so that the documents having advanced on the guide surface of the ceiling guide plate 77 may be guided without fail between the guide plate 78 and the paper discharging belt 56.

Numeral 82 designates a switching pawl which is disposed midway of the aforementioned paper discharging guide plate 55 for switching the processed documents between a circulating discharge passage A directed toward the document stacker 3 and an external discharge passage B directed to a paper tray 83 outside of the machine. This switching pawl 82 is made movable to open the external discharge passage B, when the aforementioned rear end regulating member 5 is returned to the home position, and the circulating discharge passage A when the rear end regulating member 5 is not in the home position. This switching action may be accomplished by using either a solenoid or another suitable mechanical means.

Reference numeral 84 designates the manual insertion plate which has its base end hinged to the upper surface of the leading end of the aforementioned ceiling guide plate 77. This manual insertion plate 84 is usually folded on the upper surface of the ceiling guide plate 77, as shown in FIG. 1. When the documents are fed one by one in the SDF mode, the manual insertion plate 84 can be extended on its hinged portion to cover the document stacker 3. Upon this extension, the leading end of the manual insertion plate 84 approaches the paper feeding belt 21. Moreover, the manual insertion plate 84 is so marked on its extended upper surface as to indicate the size of the documents to be fed so that the user can acknowledge the document insertion position. When the manual insertion plate is extended, still moreover, a not-shown SDF actuator may advantageously be turned on.

In the embodiment thus far described, the documents are set in the laminated state by directing the copy surfaces upward and in the order of pages and by bringing their rear ends into abutment against the rear end regulating member 5 in the home position. Then, the widthwise direction is regulated by the transverse width regulating plates 6 and 6'. After this, the number of copies is inputted, and the copy button is depressed to start the copying operations. Then, the gate driving source 17 for driving the gate member 7 is energized to lift the gate member 7 to a position, in which the laminated documents can sufficiently advance below the gate member 7.

When the driving source 72 for the rear end regulating member 5 is started, the document is pushed in the feeding direction and the leading end of the documents is passed below the gate member 7 and is detected by the stack sensor, so that the gate driving source 17 is energized to move the gate member 7 downward. At this time, the pin 14 implanted in the shaft 11 turns to be moved far away from the gate lever 12 so that the gate member 7 can always push down the upper surface of the documents by its own weight or by a spring regardless of the volume of the documents. Since this gate member 7 has its lower edge shaped in comb teeth, it can push the documents onto the paper feeding belt 21 while undulating the documents in cooperation with the ribs 3a formed on the upper surface of the document stacker 3.

In the position in which the push-up pin 14 is far apart from the gate lever 12, as has been described hereinbefore, the gate cam gear 16 is rotated by the gate driving source 17 to rock up and down the clutch lever 31, which is retained on the projection 30b of the sleeve 30a of the one-rotation spring clutch 30, with its cam forming land 16b thereby to connect the semicircular rollers 28 and 29 to the main motor 100 so that the push-out belt 20 is run. Then, the documents are pushed out toward the nip between the paper feeding belt 21 and the stop roller 22. Since, at this time, the paper feeding belt 21 is left irrational by the action of the electromagnetic clutch 21a, the lower ones of the documents pushed out advance in the form of a wedge into the nip between the paper feeding belt 21 and the stop roller 22.

Next, the electromagnetic clutch 21a is turned on to run the paper feeding belt 21 in the paper feeding direction. Since, at this time, the stop roller 22 contacting the paper feeding belt 21 is held irrotational, the lowermost one of the documents is fed out by the paper feeding belt 21 whereas a second or subsequent documents are suppressed by the stop roller 22 so that the overlap feed is prevented. During rotations of this paper feeding belt 21, the aforementioned push-out belt 20 is synchronously started to that only the lowermost document is sucked and separated during one rotation from the laminated documents and is pushed out in the paper feeding direction. In other words, the overlap preventing function of the stop roller is further improved.

As stated above, the rear end regulating member 5 is stopped when the leading end of the document is detected by the stack sensor 27 and then retracted to a position specified by the document size.

One document thus fed out from the paper feeding belt 21 enters the forward passage 35 and is conveyed at a synchronous exposure rate, while being nipped by the conveyor roller 38, to the platen glass plate 36 and the conveyor belt 41. At a timing for each size after the leading end of the document has passed across a synchronous sensor 85 disposed midway of the forward passage 35 (i.e., immediately under the conveyor roller 38), the electromagnetic clutch 21a is turned off.

The document thus conveyed by the aforementioned conveyor roller 38 is exposed by the fixed optical system 54 to form an image on the drum while being conveyed at the synchronous exposure rate on the platen glass plate 36 by the conveyor belt 41. The document thus exposed is moved upward along the paper discharge guide plate 55, held by a discharge belt 56 and holding rollers 75 and 76 abutting against the discharge belt 56, forwarded on the guide surface of a ceiling guide plate 77 through the upper surface side of the discharge belt 56, led to the under side of a paper discharge aperture guide plate 78, and discharged to the document stacker 3 after passed through a gap between the discharge belt 56 and the holding roller 79 abutting against the discharge belt 56.

The documents discharged onto the document stacker 3 are arranged by the gate member 7 for the next paper feeding. In this state, the document is prevented from passing below the gate member 7, because the lower edge of the gate member 7 is serrated.

The feeding operations thus far described are repeated at different feed timings and synchronous conveyance speeds, which are determined differently for each copy size and magnification, until the documents below the gate member are exhausted. If it is detected by the stack sensor 27 that no document is present below the gate and it is detected by a second paper discharge sensor 86b that the last document has been discharged, the gate member 7 is lifted again to feed out the stacked documents with the rear end regulating plate 5 so that the aforementioned operations may be repeated. If the set number of documents have been completed and if this completion is detected by the aforementioned second paper discharge sensor 86b, the rear end regulating plate 5 returns to its home position so that it is ready for the subsequent operations.

The above explanation is such a case that the document having one side to be copied in the RDF mode. In this case, the document stopper 50 arranged at the paper discharge end of the platen glass plate 36 in the reproducing machine 1 is retracted under the surface of the platen glass plate 36, while the optical exposure system 54 is the fixed mode at the standard position. When the reproducing machine is set in the ADF mode, the optical exposure system 54 is changed to a movable mode and when the sensor arranged in the forward passage 35 is actuated by the leading end of the document fed from the document stacker 3, the document stopper 50 at the discharge end of the platen glass plate 36 is projected from the surface of the platen glass plate. The leading end of the document is abutted on the projected document stopper 50 to stop the document at the position (i.e. exposure position). The optical exposure system 54 is then moved to reproduce the set number of copy or copies and the exposed document is discharged into the discharging tray 83. If the turning passage 37 is utilized one-side copying of a document having both sides to be copied can be carried out and if feeding means for both-sided document is provided not only one side but also both sides can be copied.

During the aforementioned operations, on the other hand, the clutch lever 25 to act upon the projection 24b of the sleeve 24a of the spring clutch 24 mounted on the shaft of the stop roller 22 is in its inoperative position while the gate member 7 is lowered and placed on the documents. As a result, the stop roller 22 is left irrotional because the spring of the spring clutch 24 is tightened, even if it receives the counterclockwise rotating force from the paper feeding belt 21 so that the overlap feed of the documents can be prevented without fail.

The following description involves the case in which the manual insertion plate 84 is extended to feed the documents in the SDF mode.

If, in this case, the gate member 7 is brought to its lifted position, the clutch lever 25 acts upon the projection 24b of the sleeve 24a of the spring clutch 24, which is mounted on the shaft of the stop roller 22, to loosen the spring action of the spring clutch 24 so that the stop roller 22 can follow the rotations of the paper feeding belt 21. As a result, the documents can be manually inserted and smoothly fed out while being nipped between the paper feeding belt 21 and the stop roller 22 following the belt 21.

The document thus fed is guided on the platen glass 36 through the forwarding passage and fed to the exposure position on the platen glass 36 and stopped by the document stopper 50. Thus, the optical system 54 is moved for exposure and the image is formed on the drum. The exposure by the movement of the optical system is repeated predetermined times. After this, the documents are conveyed in the discharging direction by the restart of the conveyor belt 41 and the retraction of the document stopper 50 having sunk, until they are discharged through the switching pawl 82 disposed midway of the paper discharge guide plate 55 from the external discharge aperture to the discharge tray 83.

(Effect of the Invention)

As stated above, the present invention is characterized by a document feeding apparatus having a paper feeding belt for feeding documents set on a document stacker from the lowermost one and a stop roller which is in contact with an upper side of a paper feeding belt for preventing the overlapped feed of the documents, wherein change-over means for changing over said stop roller between a non-rotation state and a driven rotation state is provided. Accordingly, when the stop roller is in the driven mode, the separating means of the ADF or RDF is deenergized so that even if the paper feeding aperture of the ADF or RDF is made identical to that of the SDF the documents can be fed without any damage. Further, when the feed of the documents is carried out in the driven mode the working point of the stop roller is varied arbitrary so that it is effective to the wear and paper powder problems at the ADF or RDF. At the SDF, the stop roller is driven so that the drive load can be reduced effectively.

Further, a document feeding apparatus of the present invention has a paper feeding aperture for feeding on a platen glass of a reproducing machine documents stacked on a document stacker, after separated by separating means one by one from the lowermost one, a paper circulating and discharging aperture for returning to the document stacker a document after it has processed on said platen glass, and a paper discharge aperture communicated to a path of paper circulating and discharging through a change-over pawl arranged on the way of said path aperture for discharging the document to the outside, wherein said paper feeding aperture having said separating means is used as a paper feeding aperture for inserting a paper manually.

Accordingly, in case that a plurality of copies are obtained from plural documents, the documents are set on the document stacker, the documents are fed one by one from the lowermost one to the platen glass with synchronous exposure and returned on the uppermost one. Said steps are repeated required times automatically to make a copy bundle corresponding to the document bundle. The stacked or folded documents on the document stacker can also be fed one by one and circulated automatically with a high reliability. Further, the documents can be fed in the manual insertion system, and discharged after the positioning and exposing. Furthermore, the directions of the documents can be set identical, because the paper feeding aperture is used commonly to the manual insertion system and the automatic system.

Further, according to the present invention, a reproducing machine having a document feeding apparatus can select a circulating copy mode wherein a document which is fed from a document supply portion and exposed on a platen glass plate is returned to the document supply portion or a non-circulating copy mode wherein the exposed document is discharge to a discharge paper tray provided outside the machine, so that the document is exposed while moving in said circulating copy mode, and the document in a stational state is exposed in the non-circulating copy mode. Accordingly the copying operation can be carried out effectively by simply operating the mode change-over means in the manual mode, SDF mode, ADF mode or RDF mode.

What is claimed is:

1. In a document feeding apparatus having an automatic document feed mode and manual document feed mode, said apparatus including a paper feeding belt drivable in a single direction for feeding documents from a stack set on a document stacker, wherein the lowermost document in the stack is fed, and a stop roller placed in contact with an upper surface of the paper feeding belt to prevent the overlapped feed of documents, the improvement comprising the common use of said belt and roller in both the automatic document feed mode and manual document feed mode, a change-over means being included to selectively change-over said stop roller means from a non-rotation state to a driven rotation state, said belt being driven and said roller being in the non-rotation state in the automatic document feed mode, and said belt being driven and said roller being rotationally driven by said belt in the manual document feed mode.

2. The document feeding apparatus as set forth in claim 1, wherein said change-over means has a spring clutch provided on a shaft of said stop roller.

3. The document feeding apparatus as set forth in claim 1, wherein said change-over means serves such that said stop roller becomes to a state wherein the stop roller can be driven interconnecting to an elevating operation of a gate member for discriminating a document to be fed on the document stacker and a document which is stacked again on the document stacker after it has passed through a processing portion and that the stop roller is changed over to the non-rotation state at a down position of the gate member.

4. A reproducing machine including the document feeding apparatus of claim 1, said apparatus having a circulating copy mode wherein a document fed from a document supply portion and exposed on a platen is returned to said document supply portion and, a non-circulating copy mode wherein the exposed document is discharged to a discharge paper tray provided outside said machine.

5. The reproducing machine of claim 4 wherein the document is exposed while moving in said circulating copy mode and is exposed while stationary inn said non-circulating copy mode.

6. The reproducing machine having a document feeding apparatus as set forth in claim 5, wherein an optical exposure system is movable reciprocately centering about a suitable portion near the paper discharge side of a platen glass plate in the non-circulating copy mode wherein the documenting the stationary state is exposed.

7. The reproducing machine having a document feeding apparatus as set forth in claim 6, further comprising a member for stopping the document provided at the end portion of the platen glass plate at the discharge side, said member being lowered under the platen glass plate in the circulating copy mode whereas said member is projected above the platen glass plate in the non-circulating copy mode.

8. The reproducing machine having a document feeding apparatus as set forth in claim 5, further comprising a member for stopping the document provided at an end portion of the platen glass plate at the discharge side, said member being lowered under the platen glass plate in the circulating copy mode whereas said member is projected above the platen glass plate in the non-circulating copy mode.

9. In a document feeding apparatus having an automatic feed mode and a manual document feed mode, said apparatus including a paper-feeding means for feeding the lowermost document of a stack of documents stacked on a document stacker, separating means for separating a single document from said stack, a paper circulating and discharging aperture for returning said single document to said stack after said single document is processed on a platen glass plate and a paper discharge aperture in communication with the paper circulating and discharging path through a change-over pawl arranged in said path, the improvement comprising the common use of said paper feeding means in both the automatic feed mode and manual feed mode, wherein said paper feeding means comprises a paper feeding belt drivable in a single direction and a stop roller placed in contact with an upper surface of the upper feeding belt to prevent the overlapped feed of documents, said belt being driven and said roller being in a non-rotation state in the automatic document feed mode, and said belt being driven and said roller being rotationally driven by said belt in the manual document feed mode.

10. The document feeding apparatus as set forth in claim 9, further comprising a document stopper which is projected for stopping the document at a document exposure position on the platen glass plate in a copy mode in which an optical exposure system is moved and which is lowered under the platen glass plate in a copy mode in which the optical exposure system is fixed.

11. The document feeding apparatus of claim 9 wherein paper separation is achieved by bringing said stop roller into contact with said paper feeding belt.

12. The document feeding apparatus as set forth in claim 11, wherein said stop roller becomes a driven state in a manual insertion mode.

* * * * *